United States Patent [19]

Mitchell

[11] Patent Number: 4,872,428
[45] Date of Patent: Oct. 10, 1989

[54] IMPROVEMENTS IN OR RELATING TO DRIVING CONNECTIONS BETWEEN TWO ROTATABLE BODIES

[75] Inventor: Stephen W. Mitchell, Bury, England

[73] Assignee: National Research Development Corporation, London, England

[21] Appl. No.: 297,199

[22] PCT Filed: May 13, 1988

[86] PCT No.: PCT/GB88/00376
§ 371 Date: Jan. 4, 1989
§ 102(e) Date: Jan. 4, 1989

[87] PCT Pub. No.: WO88/08919
PCT Pub. Date: Nov. 17, 1988

[30] Foreign Application Priority Data

May 14, 1987 [GB] United Kingdom ............... 8711366

[51] Int. Cl.$^4$ ............... F01L 1/04; F01L 1/34
[52] U.S. Cl. ............... 123/90.17; 123/90.31; 74/568 R
[58] Field of Search ............... 74/568 R, 571 L; 123/90.17, 90.31

[56] References Cited

U.S. PATENT DOCUMENTS

| Re. 31,917 | 6/1985 | Mitchell | 123/90.31 |
| 3,010,339 | 6/1989 | Brock | 74/568 R |
| 3,491,604 | 1/1970 | Levi | 74/63 |

FOREIGN PATENT DOCUMENTS

| 398701 | 7/1924 | Denmark . |
| 0179581 | 4/1986 | European Pat. Off. . |
| 2626239 | 12/1976 | Fed. Rep. of Germany . |
| 3211437 | 10/1982 | Fed. Rep. of Germany . |
| 2197427 | 3/1974 | France . |
| 2261413 | 9/1975 | France . |
| 307564 | 3/1929 | United Kingdom . |
| 2066361 | 7/1981 | United Kingdom . |
| 2138094 | 10/1984 | United Kingdom . |

OTHER PUBLICATIONS

Automotive Engineering, vol. 88, No. 10, Oct. 1980, (Dallas, Tex., US), D. Scott et al: "Eccentric cam drive varies valve timing", pp. 120–124, see p. 122, lines 40–45; figures.

Primary Examiner—David A. Okonsky
Assistant Examiner—Weilun Lo
Attorney, Agent, or Firm—Cushman, Darby & Cushman

[57] ABSTRACT

A driving connection between a first and hollow shaft (1) and a second shaft (3) within it, the axes (19, 20) of the two shafts being parallel at all times. By relative radial displacement of the two axes, the first shaft rotates at a variable and fluctuating speed within each revolution in response to uniform rotation of the second shaft. The ball (36) or part-cylindrical (22) end of a radial arm (2), carried by the second shaft, engages rotatably with a recess (37, 31) in a block (4) movable in a radial slideway (23) formed on the first shaft. Axial compactness is promoted by the arm, block and slideway all lying in a common radial plane (30), and radial compactness by the manner of engagement between the arm end (36, 22) and the corresponding recess (37, 31). The invention finds particular use where the first shaft (1) is the camshaft of an internal combustion engine, and in which the relative movement of the shaft axes (19, 20) may therefore be used to vary the timing of the engine valves (7, 8).

13 Claims, 1 Drawing Sheet

IMPROVEMENTS IN OR RELATING TO DRIVING CONNECTIONS BETWEEN TWO ROTATABLE BODIES

This invention relates to driving connections between two rotatable bodies having parallel but laterally-displacable axes of rotation, the first body being hollow and the second body being located within it. The invention applies particularly to connections in which the two bodies are both shafts, the first body being a hollow shaft and the second body—which is probably solid and the driving member of the combination—being located within it. The invention thus relates especially to mechanisms of the kind described in UK Patent number GB 2066361 B and European specification No. EP-A-0179581 which operate the valves of internal combustion engines, which are capable of varying the valve timing during operation to suit changes in operating conditions, and which make use of concentric rotatable shafts. UK Patent number GB 2066361 B shows a four cylinder in-line engine with the four inlet valves of the four cylinders offset relative to the four exhaust valves. This valve arrangement leaves space between the camshaft bearings of one cylinder and the corresponding bearings of the adjacent cylinder, and this space is used for the variable angular velocity mechanism which drives the short camshafts of both the cylinders. European specification No. EP-A-0179581 also describes a valve operating mechanism in which a hollow camshaft is driven by a solid shaft mounted within it, the axes of the two shafts remaining parallel at all times but being displaceable radially relative to each other. Each shaft carries a radial arm, the two arms being separated from each other in the axial direction, and one end of an axially-aligned pin is fixed to one arm. The other end of the pin engages centrally with a rectangular block which can slide up and down a radial slot formed in the second arm to accommodate relative radial movement of the axes of the two shafts.

However, present compact engine designs are now increasingly using inlet and exhaust valves which are in-line with the cylinder centres, both in engines with one inlet and one exhaust valve per cylinder and in engines with two inlet and two exhaust valves per cylinder. There is also a strong preference for the valve-operating cams to operate directly onto bucket tappets, instead of onto rockers or levers as in GB 2066361 B. Such designs leave very little space to accommodate the variable angular velocity mechanism. Similarly, the necessary axial gap (spanned by the pin) between the two radial arms in No. EP-A-0179581 requires space that can ill be afforded in a compact engine.

The present invention arises from appreciating the possibility of components of different geometry, making possible in turn a driving connection of greater axial compactness but with no less capacity for timing variation. The invention is defined by the claims, the disclosure of which is to be understood as included within the disclosure of this specification, and the invention will now be described, by way of example, with reference to the accompanying drawings in which:

Figure 1:
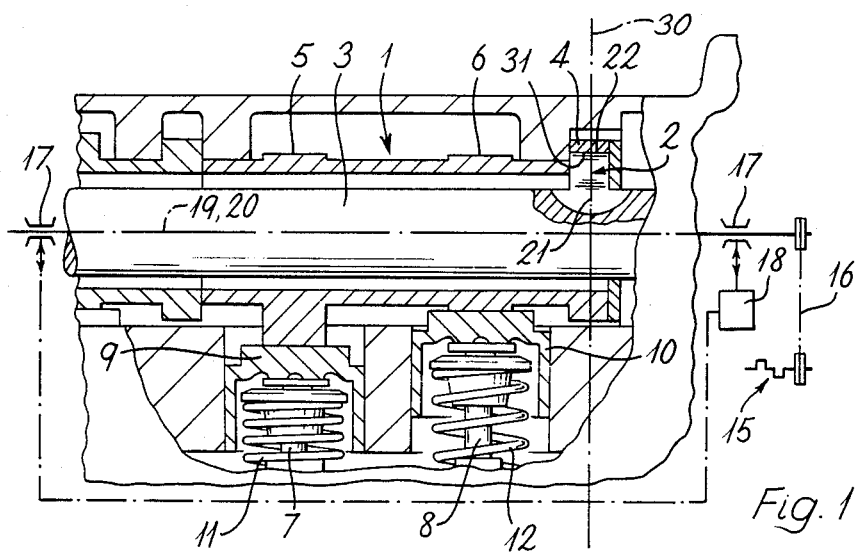
FIG. 1 is a section through part of an internal combustion engine, taken in a plane including the axis of a camshaft.

In the sectional views of FIGS. 2–5 the customary cross-hatching of certain of the parts has been omitted, so as to avoid hiding lead lines and other detail. FIG. 1 shows an internal combustion engine including a first body in the form of a short, hollow camshaft 1, similar to those shown in UK Patent No. GB 2066361 B. Camshaft 1 carries two cams 5 and 6 which actuate two valves 7 and 8 by means of bucket tappets 9 and 10, and which are returned by means of valve springs 11 and 12 respectively.

Within the hollow camshaft 1 runs a second body in the form of a solid driving shaft 3. As is schematically shown, this shaft is driven from the engine crankshaft 15 by a chain or like connection 16. It is also supported by bearings 17 which are movable in synchronism whereby to displace the movable axis 20 of shaft 3 relative to the fixed axis 19 of camshaft 1, without ever causing these two axes to fall out-of-parallel with each other. As will be explained, mechanism 18 to effect the displacement is responsive to engine speed, and operates in a manner which is known per se (as described, for instance, in UK Patent number GB 2066361 B) so as to vary the timing of valves 7 and 8 by causing camshaft 1 to rotate with a variable pattern of fluctuating velocity within each revolution, in response to the drive transmitted to it from shaft 3 which rotates at a substantially uniform angular velocity within each revolution.

A driving member 2 in the form of a substantially radial arm is connected to shaft 3 by a Woodruff-type connection 21. The outer end 22 of member 2 has a part-cylindrical shape and thus a part-circular outline which engages rotatably in a corresponding recess in the form of a cavity 31 formed in a block 4 which is mounted to slide in a radial slot 23 formed in a flange 24 mounted on camshaft 1. The inner radius of most of flange 24 is equal to that of the rest of camshaft 1, while the radius of the outer rim 25 of the flange is considerably greater than the radius of the outer surface 26 of the rest of camshaft 1.

Figure 2:
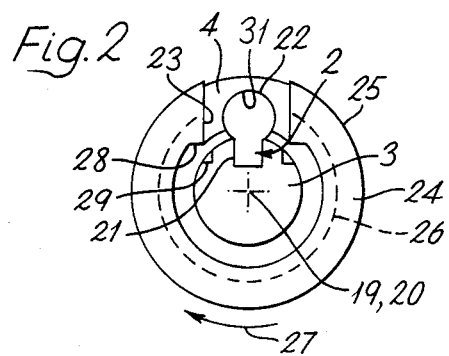
FIG. 2 is a section through that camshaft and its associated driving member, taken in a plane at right angles to the camshaft axis, with the axes of the camshaft and its driving shaft coincident.
Figure 3:
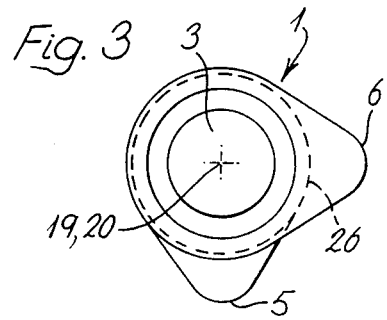
FIG. 3 is a similar view and shows the two cams carried by the camshaft.
Figure 4:
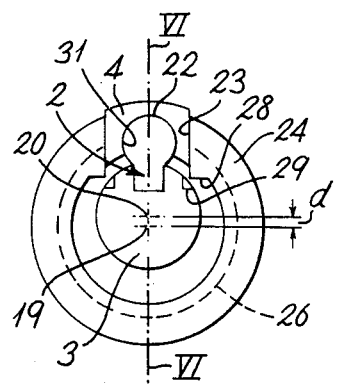
FIG. 4 is similar to FIG. 2 but shows the maximum separation between the axes of the camshaft and driving shaft.

If driving shaft 3 is rotating at uniform angular velocity, and the axes 19 and 20 of camshaft 1 and shaft 3 are coincident as shown in FIG. 2, then camshaft 1 will also rotate at the same uniform angular velocity. However if mechanism 18 has operated to displace axis 20 so that it now lies a distance d from axis 19, as shown in FIG. 4, the engagement between the outer end 22 of member 2 and the corresponding cavity 31 in block 4 causes that block, at the illustrated moment in a revolution of the camshaft 1, to lie at a radially more-outward position than it did in FIG. 2. It will be apparent to the man in the art that if shaft 3 and camshaft 1 now together execute one revolution while their respective axes 20 and 19 maintain the positions shown in FIG. 4, in the course of that revolution block 4 will move radially inwards relative to camshaft 1 until it lies 180 degrees from where it is shown in the Figure, and will then move radially outwards again for the remaining 180 degrees of the revolution. The position shown in FIG. 2, in which axes 19 and 20 coincide, represents one extreme of the relative displacement of which those axes are capable, and represents the extreme position that mechanism 18 will typically cause them to adopt when engine speed is high and efficient operation calls for camshaft 1 to rotate in synchronism with its driving shaft 3. FIG. 4 shows the opposite condition in which there is maximum displacement between axes 19 and 20. In this condition, which typically will give optimum valve timing when engine speed is very low, the rotary motions of camshaft 1 and driving shaft 3 are as different as possible. If shaft 3 is rotating at uniform speed in the direction of arrow 27 then camshaft 1 will be driven at a fluctuating angular velocity having a minimum value when the camshaft is in the position shown, this minimum rising steadily to a maximum value 180 degrees later and then falling back to the minimum at 360 degrees.

Figures 5, 6:
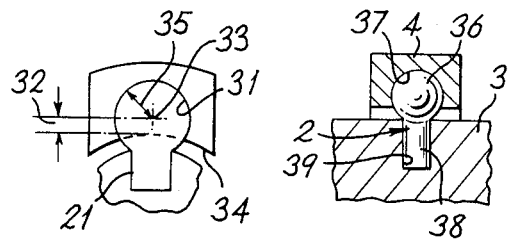
FIG. 5 is similar to part of FIG. 2 but is on a larger scale and includes further detail.
FIG. 6 shows a modified design, viewed as if it were a section on the line VI—VI in FIG. 4.

Two features illustrated by the drawings should be specially noted. Firstly, as shown best by the combination of FIGS. 1 and 2, that the arm 2, the block 4 and the slideway 23 all coincide with a common plane 30 lying at right angles to axes 19, 20. This obviously promotes axial compactness and contrasts particularly with designs like that shown in European specification No. EP-A-0179581 where there must be axial separation between the equivalents of our arm 2 and slideway 23. Secondly, as shown in FIG. 5, the outline of the cylindrical cavity 31 in block 4 is only part-circular. The radial distance 32 separating the centre of curvature 33 of the arm end 22 from the radially-inner edge 34 of the block is substantially less than the radius 35 of the curvature. The angle subtended at 33 by the curved wall of cavity 31 exceeds 180° so as to hold end 22 captive, but is well short of 360°. The advantage of such a geometry, compared for instance with that of No. EP-A-0179581 where one end of the pin fits rotatably within a complete hole formed in the comparable block, is to shorten the effective radius of block 4 about axis 19 and thus make the mechanism more compact radially as well as axially.

Another part-circular shape such as a part-spherical shape could be substituted for the end 22 of member 2 and the corresponding recess in block 4, instead of the part-cylindrical shape shown in FIGS. 1, 2, 4 and 5. FIG. 6 shows such a substitution, with a part-spherical end 36 of arm 2 making a rotary joint within a similar cavity 37 in block 4, in place of the part-cylindrical equivalents of previous Figures. The advantages of this form of connection between shaft 3 and camshaft 1 include axial compactness, allowing the end 36 and its corresponding cavity 37 to engage over a relatively large area within a short axial length, and also the avoidance of circumferential twist upon the connection between the two shafts, and so of any resultant axial component in the reaction set up between them in use.

As FIG. 2 shows, the inner radius of flange 24 is deepened by shoulders 28 adjacent to the walls of slideway 23, to improve the guidance and support of block 4 when it is in its radially-innermost position, that is to say 180° from the position shown in FIG. 4. Conversely shaft 3 is machined as at 29 to ensure clearance between the shaft and the shoulders 28 when the shaft is in its fully eccentric position, that is to say when shaft and camshaft are displaced by distance d as in FIG. 4.

Alternatives to the Woodruff-type connection between member 2 and shaft 3 are of course possible. For instance, a cylindrical spigot 38 formed on the innermost end of the member could fit tightly within a corresponding cylindrical cavity 39 formed in the shaft 3, as shown in FIG. 6.

In FIG. 1 the illustrated valves 7 and 8, both operated by camshaft 1, are an inlet and an exhaust valve, but the invention could of course be used on a twin camshaft engine where a single camshaft will operate one or more valves all of the same kind.

I claim:

1. A driving connection between rotatable first and second bodies (1, 3) having parallel but laterally-displacable axes of rotation (19, 20), the first body being hollow and the second body being located within it, in which one of the bodies (3) carries a radial arm (2), in which a radial slideway (23) is formed on one of the bodies (1), in which a block (4) is mounted to slide within that slideway, and in which there is a rotary joint between the block and the outer end (22, 36) of the radial arm, characterised in that a common plane (30, FIG. 1) lying at right angles to the two axes of rotation (19, 20) coincides with all three of the radial arm (2), the block (4) and the radial slideway (23).

2. A driving connection according to claim 1, characterised in that the radial arm (2) is carried by the second body (3) and the radial slideway (23) is formed on the first body (1).

3. A driving connection according to claim 2 characterised in that each body is a shaft, the second shaft (3) being the driving member of the connection and the first shaft (1) the driven member.

4. A driving connection according to claim 3 characterised in that the outer end (22, 36) of the arm (2) is of part-circular outline when viewed parallel to the shaft axes, in that a cavity (31, 37) of part-circular outline when similarly viewed is formed in the block, and in that the rotary joint is between the cavity and the outer end of the radial arm.

5. A driving connection according to claim 4, characterised in that the radial distance (32) separating the centre of curvature (33) of the cavity (31) from the radially-innermost edge (34) of the block is less than the radius of curvature (35) of the cavity.

6. A driving connection according to claim 4 characterised in that the corresponding shapes of the outer end (36) of the arm and of the cavity (37) are part-spherical.

7. A driving connection according to claim 4 characterised in that the corresponding shapes of the outer end (22) of the arm and of the cavity (31) are part-cylindrical.

8. A driving connection according to claim 3 characterised in that the first shaft (1 includes a flanged part (24) and the slideway (23) is formed within this part.

9. A driving connection according to claim 8 characterised in that the minimum and maximum radii of the flanged part (24) are respectively substantially the same as, and substantially greater than, the corresponding radii of the rest of the first shaft (1).

10. A driving connection according to claim 3 characterised in that the means of connection between the arm (2) and the second shaft (3) comprises the engagement between a cylindrical spigot (38, FIG. 6), carried by the arm, and a corresponding cylindrical recess (39) formed in the shaft.

11. A driving connection according to claim 3 characterised in that the means of connection between the arm (2) and the second shaft (3) comprises the engagement between a Woodruff-type key (21), carried by the arm, and a corresponding recess formed in the shaft.

12. An internal combustion engine including first and second rotatable bodies (1, 3) and a driving connection according to claim 1 between them, characterised in that the first body (1) is a hollow camshaft and the second body (3) drives that camshaft.

13. An internal combustion engine according to claim 12 including valves (7, 8) associated with tappets (9) of bucket or like type that are directly operated by cams (5, 6) carried by the camshaft (1).

* * * * *

UNITED STATES PATENT AND TRADEMARK OFFICE
CERTIFICATE OF CORRECTION

PATENT NO. : 4,872,428

DATED : October 10, 1989

INVENTOR(S) : Stephen W. MITCHELL

It is certified that error appears in the above-identified patent and that said Letters Patent is hereby corrected as shown below:

TITLE PAGE

[56]        References cited under

FOREIGN PATENT DOCUMENTS 398701  7/1924  Fed. Rep. of Germany

Signed and Sealed this

Twenty-sixth Day of November, 1991

Attest:

HARRY F. MANBECK, JR.

Attesting Officer

Commissioner of Patents and Trademarks